US012723770B2

(12) United States Patent
Cho et al.

(10) Patent No.: US 12,723,770 B2
(45) Date of Patent: Sep. 1, 2026

(54) REFRIGERANT LEAK DETECTOR AND AIR CONDITIONER INCLUDING REFRIGERANT LEAK DETECTOR

(71) Applicants: LG ELECTRONICS INC., Seoul (KR); PUSAN NATIONAL UNIVERSITY INDUSTRY-UNIVERSITY COOPERATION FOUNDATION, Busan (KR); CHANGWON NATIONAL UNIVERSITY INDUSTRY ACADEMY COOPERATION CORPS, Changwon-si (KR)

(72) Inventors: Changhwan Cho, Seoul (KR); Junggeun Oh, Seoul (KR); Sangyoung Kwon, Seoul (KR); Manyeong Ha, Busan (KR); Sanghu Park, Busan (KR); Jaesun Lee, Changwon-si (KR)

(73) Assignees: LG ELECTRONICS INC., Seoul (KR); PUSAN NATIONAL UNIVERSITY INDUSTRY-UNIVERSITY COOPERATION FOUNDATION, Busan (KR); CHANGWON NATIONAL UNIVERSITY INDUSTRY ACADEMY COOPERATION CORPS, Changwon-si (KR)

( * ) Notice: Subject to any disclaimer, the term of this patent is extended or adjusted under 35 U.S.C. 154(b) by 129 days.

(21) Appl. No.: 18/739,565

(22) Filed: Jun. 11, 2024

(65) Prior Publication Data

US 2024/0418383 A1 Dec. 19, 2024

(30) Foreign Application Priority Data

Jun. 13, 2023 (KR) ........................ 10-2023-0075617

(51) Int. Cl.
*F24F 11/36* (2018.01)
*G01M 3/24* (2006.01)

(52) U.S. Cl.
CPC ............. *F24F 11/36* (2018.01); *G01M 3/243* (2013.01)

(58) Field of Classification Search
CPC .... F24F 11/36; F25B 2500/222; G01M 3/243
See application file for complete search history.

(56) References Cited

U.S. PATENT DOCUMENTS 11,313,754 B2 * 4/2022 Szurley .................. G06N 20/00
2018/0252611 A1 9/2018 Cole
2023/0109334 A1 * 4/2023 Welch .................. F25B 49/005 62/129

FOREIGN PATENT DOCUMENTS

JP 11-210999 8/1999
JP 2020-0515850 5/2020
(Continued)

OTHER PUBLICATIONS

European Search Report issued in Application No. 24181559.6 dated Oct. 30, 2024.
(Continued)

*Primary Examiner* — Jonathan Bradford
(74) *Attorney, Agent, or Firm* — KED & ASSOCIATES

(57) ABSTRACT

A refrigerant leak detector and an air conditioner including a refrigerant leak detector. The refrigerant leak detector may include an acoustic emission sensor that detects an elastic wave generated from a refrigerant leak site in a refrigerant pipe, and a jig comprising a lower end portion configured to contact an outer circumferential surface of the refrigerant pipe and an upper end portion in contact with the acoustic emission sensor. The lower end portion may include a curved surface configured to contact the refrigerant pipe.

(Continued)

The upper end portion may include a flat surface that supports the acoustic emission sensor.

17 Claims, 15 Drawing Sheets

(56) References Cited

FOREIGN PATENT DOCUMENTS

| | | |
|---|---|---|
| KR | 10-2014-0100341 | 8/2014 |
| KR | 10-2017-0016197 | 2/2017 |
| KR | 10-2021-0153223 | 12/2021 |
| WO | WO 2019/129510 | 7/2019 |

OTHER PUBLICATIONS

Korean Office Action issued in Application No. 10-2023-0075617 dated Nov. 18, 2024.

* cited by examiner

REFRIGERANT LEAK DETECTOR AND AIR CONDITIONER INCLUDING REFRIGERANT LEAK DETECTOR

CROSS-REFERENCE TO RELATED APPLICATION(S)

This application claims priority under 35 U.S.C. § 119 to Korean Application No. 10-2023-0075617 filed in Korea on Jun. 13, 2023, whose entire disclosure is hereby incorporated by reference.

BACKGROUND

1. Field

A refrigerant leak detector and an air conditioner including a refrigerant leak detector are disclosed herein.

2. Background

In general, an air conditioner is an apparatus that cools and/or heats an indoor space by performing a process of compressing, condensing, expanding, and evaporating a refrigerant. An air conditioner may include an outdoor unit and an indoor unit connected to the outdoor unit. In addition, an air conditioner may be divided into a cooling system that operates a refrigerant cycle in only one direction to supply only cold air to a room, and a cooling/heating system that supplies cold or warm air to the room by selectively operating a refrigerant cycle in both directions.

An air conditioner basically forms a refrigeration cycle consisting of a compressor, condenser, expansion valve, and evaporator. Gaseous refrigerant compressed in the compressor flows into the condenser and changes phase into liquid refrigerant. In the condenser, the refrigerant changes phase and emits heat to the outside. Afterwards, the refrigerant discharged from the condenser expands as it passes through an expansion valve and flows into the evaporator. The liquid refrigerant flowing into the evaporator changes phase into gaseous refrigerant. Likewise, the refrigerant absorbs external heat while undergoing a phase change in the evaporator.

In a product that uses refrigerant, such as an air conditioner, if refrigerant leaks due to damage to a pipe, a product, and a connection portion, for example, performance is degraded and an inconvenience, such as noise, occurs. When a refrigerant leak occurs, a leak source is often as small as several to tens of micrometers. Therefore, it is difficult to detect refrigerant leaks, and there is a high possibility of confusion with other causes, such as fan noise, thereby making product quality control difficult.

A lot of research is being conducted on devices and methods for detecting refrigerant leaks. Korean Patent Publication No. 10-2014-0100341 (hereinafter "Prior Document 1", which is hereby incorporated by reference, installs a plurality of sensors in a refrigerant pipe and detects a location of a leak based on a size of a measured value of each sensor. In Prior Document 1, it costs a lot of money to install a plurality of fixed sensors. In addition, in Prior Document 1, when leakage occurs due to damage at a minute micro level, leakage detection may be difficult if measurement loss occurs.

Japanese Patent Publication No. 2020-0515850 (hereinafter "Prior Document 2"), which is hereby incorporated by reference, monitors abnormal operation of industrial equipment cooled by refrigerant fluid using an acoustic sensor, and monitors abnormal operation by distinguishing between a disturbance frequency range of signal measured by the acoustic sensor and an abnormal signal frequency range. The frequency range of signal varies depending on a system to be measured and a type of abnormal operation. The frequency of disturbance and abnormal signals cannot be limited to a specific frequency using a general method of using an acoustic sensor, and Prior Document 2 has the problem of checking frequency and setting frequency range with respect to the abnormal operation to be actually measured.

Air conditioners are divided into a conventional air conditioner in which one indoor unit is connected to an outdoor unit, and a multi-air conditioner in which multiple indoor units are connected to an outdoor unit. Such a multi-air conditioner requires installation of multiple refrigerant pipes connected to the indoor unit. Therefore, it is more difficult to detect refrigerant leakage in a multi-air conditioner, and more cost and time are required to detect refrigerant leakage.

BRIEF DESCRIPTION OF THE DRAWINGS

Embodiments will be described in detail with reference to the following drawings in which like reference numerals refer to like elements, and wherein.

DETAILED DESCRIPTION

Figure 1:
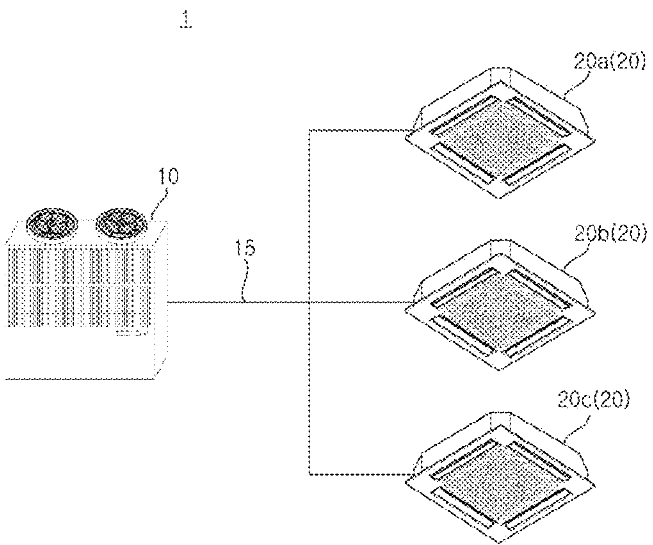
FIG. 1 is a schematic diagram of an air conditioner according to an embodiment.

Hereinafter, embodiments will be described in detail with reference to the attached drawings. However, the embodiments are not limited to these embodiments and can of course be modified into various forms.

In the drawings, parts or components not related to the description are omitted in order to clearly and briefly explain the embodiments, and identical or extremely similar parts or components are denoted by the same drawing reference numerals throughout.

The suffixes "module" and "part" for components used in the following description are simply given in consideration of the ease of writing, and do not give any particularly important meaning or role in and of themselves. Accordingly, the terms "module" and "unit" may be used interchangeably.

In addition, terms, such as first and second, may be used to describe various elements, but these elements are not limited by these terms. These terms are only used to distinguish one element from another.

FIG. 1 is a schematic diagram of an air conditioner according to an embodiment. Referring to FIG. 1, an air conditioner 1 according to an embodiment may include a plurality of units. The air conditioner 1 according to an embodiment may include at least a plurality of indoor units 20 and one or more outdoor units 10. In addition, the air conditioner 1 according to an embodiment may further include a remote control device (not shown) connected to an indoor unit, and a central controller (not shown) capable of controlling units inside of the air conditioner 1.

The air conditioner may be any of a stand-type air conditioner, a wall-mounted air conditioner, and a ceiling-type air conditioner, for example. However, for convenience of explanation, a ceiling-type air conditioner will be described hereinafter as an example. In addition, the air conditioner may further include at least one of a ventilator, an air purifier, a humidifier, and a heater, for example, and may operate in association with operations of the indoor unit and the outdoor unit.

The outdoor unit 10 may include a compressor (not shown) that receives and compresses refrigerant, an outdoor heat exchanger (not shown) that exchanges heat between the refrigerant and outdoor air, an accumulator (not shown) that extracts gaseous refrigerant from the supplied refrigerant and supplies it to the compressor, and a four-way valve (not shown) that selects a refrigerant flow path according to a heating operation. In addition, it may further include a plurality of sensors, a valve, and an oil recovery device.

The outdoor unit 10 may operate a compressor and an outdoor heat exchanger to compress or heat exchange with the refrigerant according to settings and supply the refrigerant to the indoor unit 20*a* to 20*c*. The outdoor unit 10 may be driven by a request of a central controller or the indoor unit 20*a* to 20*c*, and as a cooling/heating capacity varies in response to the driven indoor unit, a number of operating outdoor units and a number of operating compressors installed in the outdoor unit may vary.

When a plurality of outdoor units 10 is provided, the plurality of outdoor units 10 may supply refrigerant to connected indoor units, respectively. Alternatively, depending on a connection structure of the outdoor unit and the indoor unit, a plurality of outdoor units may be connected to each other and supply refrigerant to a plurality of indoor units.

The indoor unit 20*a* to 20*c* may be connected to one or more outdoor units 10 through a refrigerant pipe 15, receive refrigerant, and discharge cold air into a room. The indoor unit 20*a* to 20*c* may include an indoor heat exchanger (not shown), an indoor unit fan (not shown), an expansion valve (not shown) through which supplied refrigerant expands, and a plurality of sensors (not shown).

The outdoor unit 10 and the indoor unit 20*a* to 20*c* may be connected through a communication line to transmit and receive data to and from each other, and the outdoor unit and the indoor unit may be connected to the central controller through a separate communication line and operate under the control of the central controller.

The remote control device may be connected to each indoor unit, may input a user's control command to the indoor unit, and may receive and display state information of the indoor unit. The remote control device may communicate in a wired or wireless manner depending on a connection type with the indoor unit. In some cases, one remote control device is connected to a plurality of indoor units and settings of a plurality of indoor units may be changed through an input from one remote control device.

The outdoor unit 10 and the indoor unit 20 may be connected by the refrigerant pipe 15. The refrigerant may move between the outdoor unit 10 and the indoor unit 20 through the refrigerant pipe 15.

One or more refrigerant leak detectors (see 100 in FIG. 2) that may detect refrigerant leakage may be installed in the refrigerant pipe 15. The refrigerant leak detector 100 may be not fixed to the air conditioner 1, but may be manufactured as a mobile type which may be installed if necessary.

Figure 2:
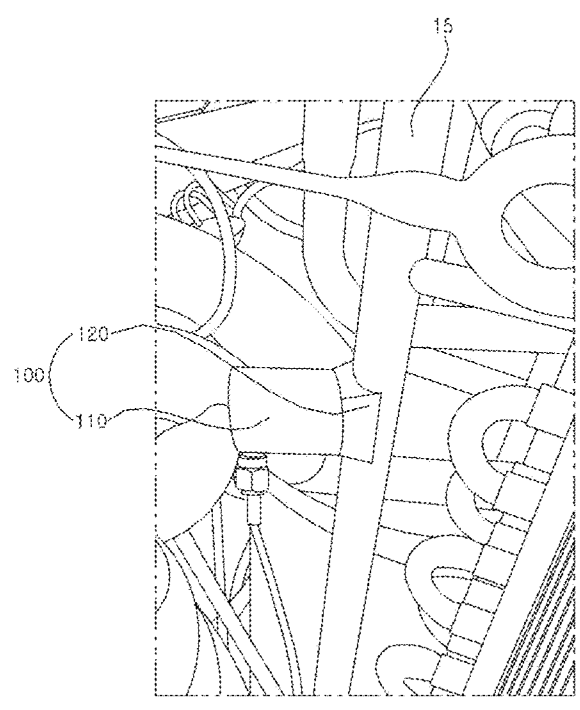
FIG. 2 is a diagram of a measurement scene using a refrigerant leak detector according to an embodiment.

FIG. 2 is a diagram of a measurement scene using a refrigerant leak detector according to an embodiment.

Based on a monitoring and control program for an air conditioner, a user or manager may monitor an operating state, such as a pressure and temperature, of each component when operating the air conditioner. If a refrigerant leak is suspected during the monitoring process, an operator may be dispatched to the site at which the air conditioner 1 is installed, and the operator may install one or more refrigerant leak detectors 100 in the air conditioner 1.

Even when the monitoring and control program is not used, in a case of product abnormality or performance deterioration, refrigerant leakage may be checked by using the movable refrigerant leak detector 100.

The operator may retrieve the refrigerant leak detector 100 after checking whether there is a refrigerant leak and a location of the refrigerant leak, and then use the same refrigerant leak detector 100 at other sites. Accordingly, the refrigerant leak detector 100 may be carried and used by the operator, thereby reducing air conditioner management costs, such as costs for determining whether there is a refrigerant leak and the location of the refrigerant leak.

In addition, according to an embodiment, an appropriate number of refrigerant leakage detectors 100 may be installed in a location requiring inspection in a pipe or product, based on air conditioner monitoring data, product abnormalities, and performance degradation, for example, thereby reducing cost and work time for leak detection.

Figure 3:
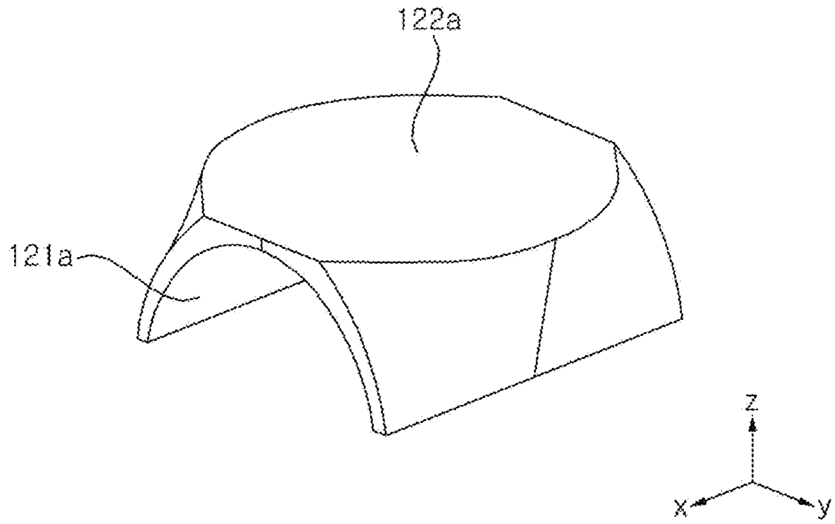
FIG. 3 is a perspective view of a jig according to an embodiment.
Figure 4:
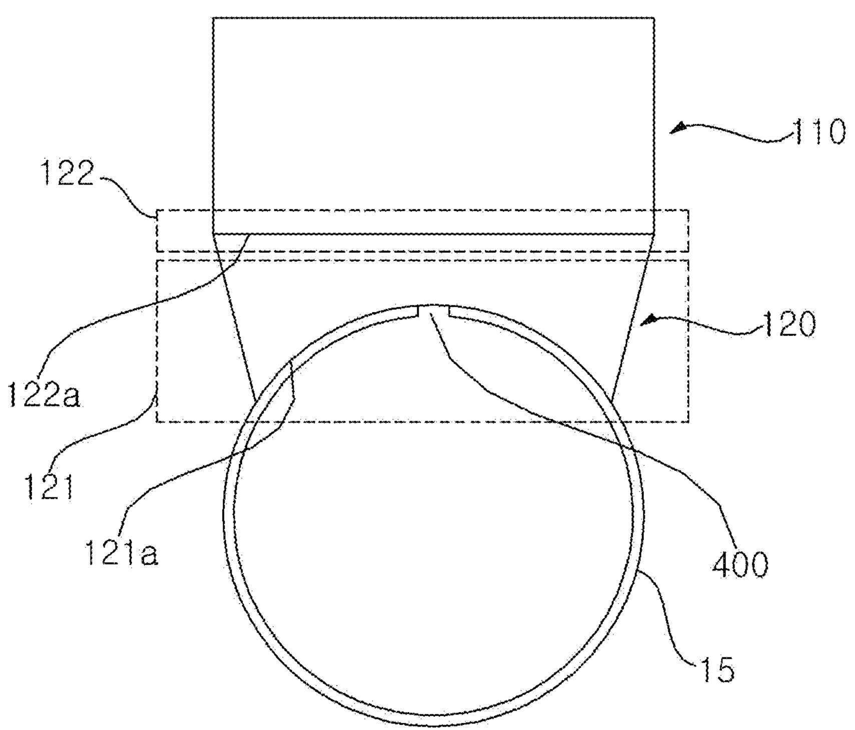
FIG. 4 is a schematic diagram of leak measurement of a refrigerant leak detector according to an embodiment.

FIG. 3 is a perspective view of a jig according to an embodiment. FIG. 4 is a conceptual diagram of leak measurement of a refrigerant leak detector according to an embodiment.

Referring to FIGS. 3 and 4, the refrigerant leak detector 100 and the air conditioner 1 may include one or more contact sensor, for example, acoustic emission sensor 110, discussed hereinafter, and a jig 120 in contact with and that supports the one or more sensor and the refrigerant pipe 15. The jig 120 may have one or a first surface that is curved and in contact with an outer circumferential surface of the refrigerant pipe 15. The jig 120 may have a flat surface formed on the other or a second surface opposite to the first surface to support the contact sensor 110.

The sensor may be an acoustic emission sensor 110. The acoustic emission sensor 110 may detect elastic waves generated at a refrigerant leak site in the refrigerant pipe 15. When a leak occurs in the refrigerant pipe 15, a certain elastic wave caused by sound or vibration generated as the refrigerant leaks from the location of the refrigerant leak is transmitted to the acoustic emission sensor 110 through the refrigerant pipe 15.

The refrigerant leak detector 100 may include the jig 120 that is in contact with the outer circumferential surface of the refrigerant pipe 15 and supports the acoustic emission sensor 110.

The refrigerant leak detector 100 and the air conditioner 1 may include the one or more sensor, that is, one or more acoustic emission sensor 110 that detects elastic waves generated in the refrigerant leak site and the jig 120 that reduces a measurement loss of elastic waves, thereby accurately and quickly detecting a refrigerant leak.

The jig 120 may surround a portion of the refrigerant pipe 15 and be in contact with the refrigerant pipe 15. The first surface of the jig 120 in contact with the refrigerant pipe 15 may be formed in a shape corresponding to the refrigerant pipe 15. That is, the first surface of the jig 120 may include a curved surface 121*a*, in correspondence with a cylindrical refrigerant pipe 15.

The second surface of the jig 120 that supports the acoustic emission sensor 110 may include a flat surface 122*a* to stably support the acoustic emission sensor 110. The jig 120 may transmit a signal from the refrigerant pipe 15 to the acoustic emission sensor 110.

Referring to FIGS. 3 and 4, the jig 120 may include a lower end portion 121 including a curved surface 121*a* in contact with the refrigerant pipe 15 and an upper end portion 122 including the flat surface 122*a* that supports the acoustic emission sensor 110.

The jig 120 may cover an upper portion based on a cross section of the refrigerant pipe 15, and the upper end portion 122*a* in contact with the acoustic emission sensor 110 has a flat structure. With such structure, a contact type between the refrigerant pipe 15 and the acoustic emission sensor 110 may be changed from a line contact to a surface contact and an intensity of a measurement signal may be increased.

In particular, a signal amplification effect may be maximized by forming the jig 120 in the shape of a partial cylinder surrounding the refrigerant pipe 15 so that a pipe-jig contact area may be maximized. With this structure, as shown in FIG. 2, leakage of the refrigerant pipe 15 may be easily measured.

An inner diameter or curvature of the curved surface 121*a* may be designed to be the same as an outer diameter or curvature of the refrigerant pipe 15 to increase the contact area between the jig 120 and the refrigerant pipe 15, and the jig 120 may be stably brought into close contact with the refrigerant pipe 15.

FIG. 3 illustrates a jig for ϕ15.8 pipe. As the diameter (pipe diameter) of the refrigerant pipe 15 varies, it is advantageous that the jig 120 is also provided in various sizes. As pipe diameters are typically available in a plurality of standardized sizes, the jig 120 may be manufactured in a plurality of shapes to correspond to the standardized pipe diameters (see FIGS. 15A to 15H).

An operator may carry the jig 120 of various sizes, and use the jig 120 corresponding to the diameter of the refrigerant pipe 15 found in the field, so that the refrigerant leak detector 100 may be stably brought into contact with the refrigerant pipe 15. An acoustic wave signal, which is generated when the refrigerant leaks from a leak source 400 and flows along the refrigerant pipe 15, may be effectively transmitted to the acoustic emission sensor 110.

The acoustic emission sensor 110 and the jig 120 may be a separate type, that is, separate components, and may be coupled by an operator in the field. For example, first, the operator may contact the jig 120 corresponding to the pipe diameter of the refrigerant pipe 15 to the refrigerant pipe 15, and attach the acoustic emission sensor 110 on the jig 120. At this time, the jig 120 and the acoustic emission sensor 110 may be coupled by a coupling member or an adhesive member, for example. For example, a viscous sealant may be used between the jig 120 and the acoustic emission sensor 110.

Alternatively, the acoustic emission sensor 110 and the jig 120 may be manufactured as a one body type. In this case, the operator may install the one body type refrigerant leak detector 100 corresponding to the pipe diameter of the refrigerant pipe 15 to the refrigerant pipe 15.

In the case of the prior art, high-pressure nitrogen gas is injected into an entire product to find the leak by applying surfactant to the leak, or a plurality of fixed sensors is installed to detect the leak. The high-pressure nitrogen pressurization method is expensive because it pressurizes high-pressure nitrogen after removing all refrigerant from the product, and it also requires high costs to install multiple sensors.

Also, it takes a long time to measure because the amount of remaining gas is compared or a cycle change is observed after high-pressure nitrogen is injected and left for a long period of time (as short as a few days, as long as a week). In addition, a product cannot be used during such a measurement period, thereby causing inconvenience to consumers. In addition, the inspection process becomes complicated because a service technician must visit a customer at least twice.

Embodiments disclosed herein provide a refrigerant leak detector that is portable for an operator and may include a contact sensor, and a refrigerant leak detection method.

The acoustic emission sensor 110 is a contact sensor and with use of the jig 120, the sensor contacts the pipe and measures vibration of the pipe and the intensity of ultrasonic waves. When a leak occurs, a higher intensity pipe vibration occurs compared to a normal state. Thus, the acoustic emission sensor 110 may be used to determine whether there is a leak and determine a location of a leak source by measuring the vibration of the pipe and the intensity of ultrasonic waves.

When using such a contact sensor, if the pipe diameter and leak source are small, the contact area between the sensor and the pipe is small due to the small size of the pipe. Measurement results vary greatly depending on a user's skill level, so that detection performance may be low.

According to at least one of embodiment, accuracy and usability of the acoustic emission sensor 110 may be improved by implementing a jig optimized for the acoustic emission sensor 110. That is, sensing accuracy may be improved using the jig 120 for reducing loss of a signal measured by the acoustic emission sensor 110.

Further, the jig 120 according to an embodiment may be implemented with a signal amplification structure that solves the narrow contact area and improves measurement sensitivity of the acoustic emission sensor 110. In designing the jig 120 for signal amplification, it is also important to transmit a signal from the pipe without attenuation.

More particularly, the jig 120 changes the contact type between the refrigerant pipe 15 and the acoustic emission sensor 110 from line contact to surface contact, thereby increasing the contact area, and amplifying the amount of signal transmission from the refrigerant pipe 15 to the acoustic emission sensor 110.

Figure 5A:
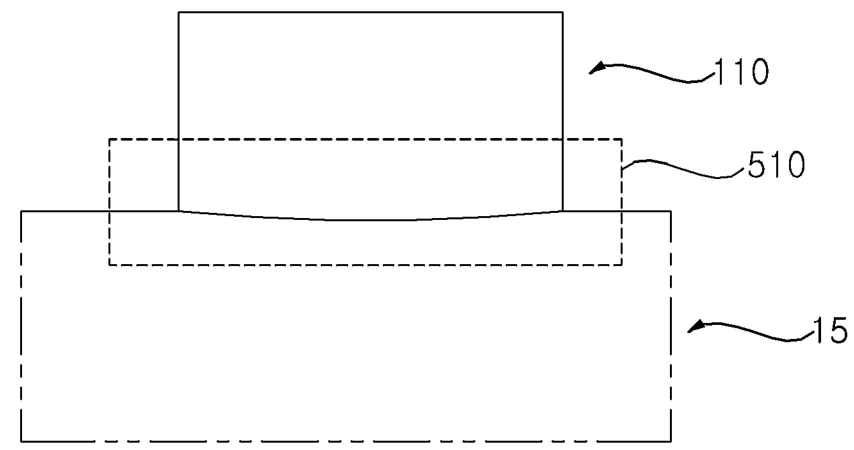
FIGS. 5A and 5B are diagrams comparing a piping contact between a conventional refrigerant leak detector and a refrigerant leak detector according to an embodiment.
Figure 5B:
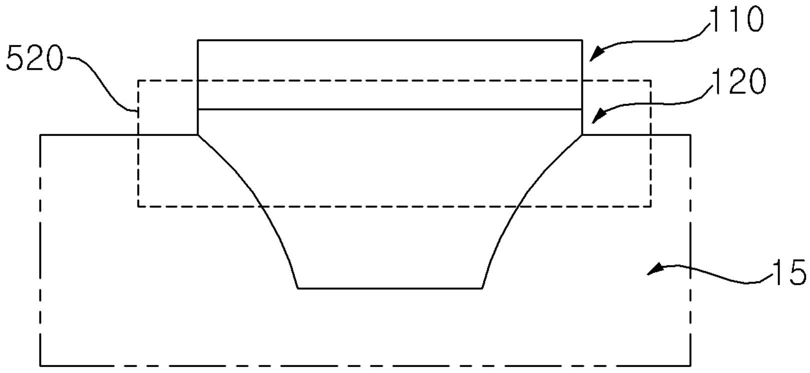

FIGS. 5A-5B are diagrams comparing piping contact between a conventional refrigerant leak detector and a refrigerant leak detector according to an embodiment.

When measuring a signal using the acoustic emission sensor 110, it is advantageous to increase the area of contact where a signal is generated and a receiver of the acoustic emission sensor 110 receives a signal.

In the case of a typical acoustic emission sensor, the contact surface of the receiver is flat. Referring to FIG. 5A, when the acoustic emission sensor 110 and the refrigerant pipe 15 come into contact with each other, only a line contact occurs between the acoustic emission sensor 110 and the refrigerant pipe 15 in a longitudinal direction in or at a contact portion 510. Accordingly, it is disadvantageous for signal reception.

Referring to FIG. 5B, the contact type within contact portion 520, which is an area of measurement, of the refrigerant pipe 15 and the acoustic emission sensor 110 may be changed using the jig 120. The first surface of the jig 120 which is the curved surface 121*a* and which is in significant contact with the refrigerant pipe 15, provides a surface contact which is not a linear contact. In addition, the second surface of the jig 120 is the flat surface 122*a* and is in significant contact with a front receiver of the acoustic emission sensor 110. Accordingly, the refrigerant pipe 15 and the acoustic emission sensor 110 are in surface contact, thereby significantly increasing the contact area, and increasing the signal transmitted through the jig 120 as the contact area increases.

In addition, the jig 120 may be made of a different material from the acoustic emission sensor 110 in order to minimize signal attenuation. For example, the case of the acoustic emission sensor 110 may be made of stainless steel, and the jig 120 may be made of a material other than stainless steel.

A material having a low attenuation coefficient may be used as the material for the jig 120. For example, the jig 120 may be made of a brass material. As brass has a low ultrasonic signal material attenuation coefficient (db/mm) of 0.15 (12 MHz), it has a small signal attenuation compared to other materials, such as aluminum and stainless steel.

Conventionally, when measuring using only a contact sensor, there was a limit to signal detection due to a signal difference occurring depending on a contact condition. According to embodiments disclosed herein, the sensitivity of the acoustic emission sensor 110 used in non-destructive testing for detecting pipe leaks, for example, is improved through the jig 120, thereby improving accuracy of refrigerant leak detection and facilitating maintenance and repair processes. Accordingly, the time consumed to identify the leak point may be reduced, and waste of materials and costs caused by replacing the entire product due to failure to identify the leak point may be reduced.

In addition, according to embodiments disclosed herein, the jig 120 may be made lighter in order to reduce an amount of mass attenuation due to mass. When designing the jig 120, the surface excluding the contact portion 520 with the acoustic emission sensor 110 may be designed to be thin in order to improve signal amplification performance.

Figure 6:
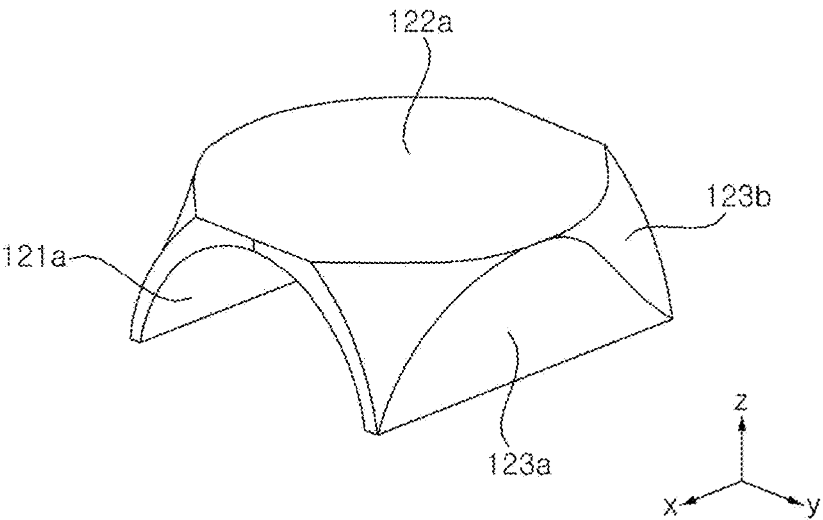
FIG. 6 is a perspective view of a jig according to another embodiment.

FIG. 6 is a perspective view of a jig according to another embodiment, and illustrates a structure in which slimming is performed for a ϕ15.8 pipe jig.

Referring to FIG. 6, an inclined surface 123*a*, 123*b*, which connects a distal end of flat surface 122*a* and a distal end of curved surface 121*a*, may be formed on both side surfaces of lower end portion 121. The inclined surface 123*a*, 123*b* may be formed through three-axis machining for slimming the jig 120.

In order to maximize the slimming effect, a plurality of inclined surfaces 123*a* and 123*b* facing different directions may be formed on both side surfaces of the lower end portion 121. The plurality of inclined surfaces 123*a* and 123*b* may include first inclined surface 123*a* and second inclined surface 123*b* having a certain or predetermined inclination from the first inclined surface 123*a*.

The first and second inclined surfaces 123*a* and 123*b* may be formed as flat surfaces, and a normal vectors of the first and second inclined surfaces 123*a* and 123*b* may be formed not to be parallel but to extend in a different direction. The normal vectors of the first and second inclined surfaces 123*a* and 123*b* may form a certain or predetermined inclination angle.

Referring to FIG. 6, considering machinability of the jig 120, slimming may be performed to remove a portion that can be removed by three-axis machining without affecting the contact surface 121*a*, 122*b*. In the example of FIG. 6, volume was reduced by about 30% compared to the example of FIG. 3.

The jig 120 may be provided with a step, or a hole, for example, to focus the signal transmitted to the receiver of the acoustic emission sensor 110.

Figure 7:
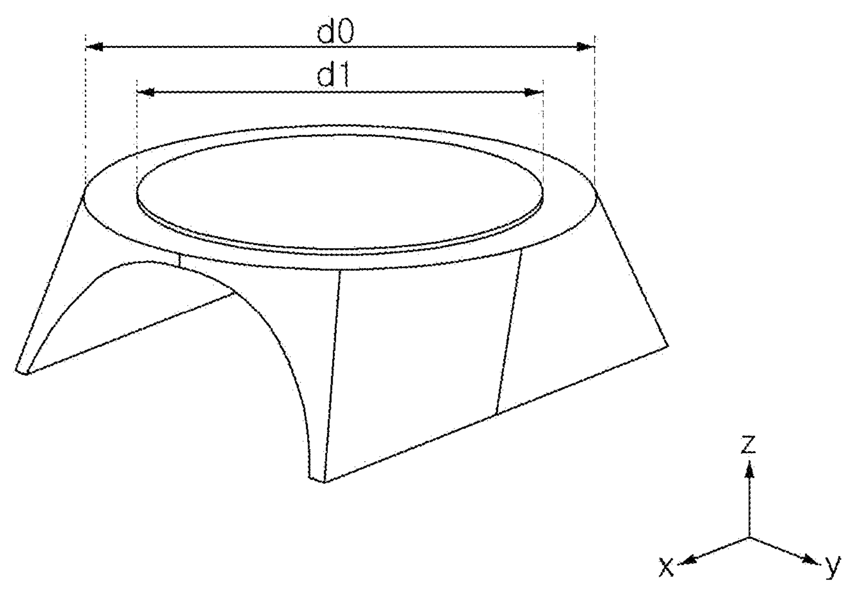
FIG. 7 is a perspective view of a jig according to another embodiment.
Figure 8:
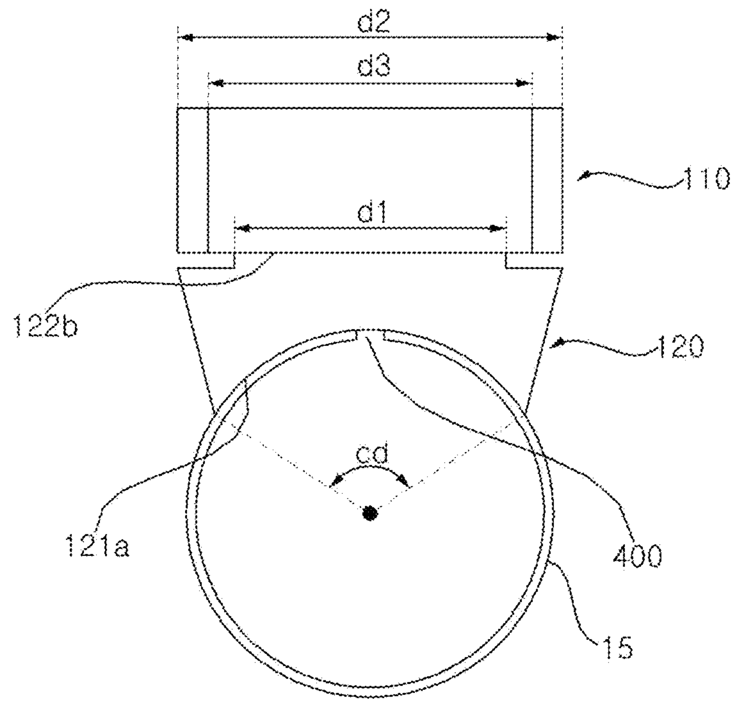
FIG. 8 is a schematic diagram of leak measurement of a refrigerant leak detector according to an embodiment.

FIG. 7 is a perspective view of a jig according to another embodiment, and FIG. 8 is a conceptual diagram of leak measurement of a refrigerant leak detector according to an embodiment, and is a structure in which a step portion is applied to the jig for a ϕ15.8 pipe in FIG. 3.

Referring to FIGS. 7 and 8, upper end 122 of jig 120 may include a step portion 122*b* formed on flat surface 122*a*. The step has the effect of focusing a signal to the step portion 122*b*, thereby reducing signal loss. The step portion 122*b* may focus the signal transmitted to the receiver of the acoustic emission sensor 110. If there is no step portion 122*b*, signal loss may occur in a portion that is not in direct contact with the receiver formed in a front partial area d3 of the acoustic emission sensor 110.

A diameter d1 of the step portion 122*b* may be smaller than a diameter d2 of the acoustic emission sensor 110. The diameter d1 of the step portion 122*b* may be at least smaller than a diameter d3 of the receiver of the acoustic emission sensor 110.

The step portion 122*b* formed in the upper end 122 of the jig 120 is a contact surface with the acoustic emission sensor 110, and its size may be determined according to the sensor diameter d2 (at least the diameter d3 of the signal receiver). The diameter d1 of the step portion 122*b* may be determined according to the diameter d2 of the acoustic emission sensor 110. For example, the diameter d1 of the step portion 122*b* may be 0.48 to 0.72 times the diameter d2 of the acoustic emission sensor 110.

The diameter of the upper portion 122 around the step portion 122*b* may be determined according to the pipe diameter of the refrigerant pipe 15. That is, the diameter do of the flat surface 122*a* may be determined in correspondence with the pipe diameter of the refrigerant pipe 15. In addition, the diameter do of the flat surface 122*a* may be larger than the diameter d1 of the step portion 122*b*.

A signal loss is small in the range of jig upper diameter/pipe diameter=0.63 to 3.15. If the ratio of the diameter do of the flat surface 122*a* and the pipe diameter is greater than 3.15 times, the flat surface 122*a* becomes unnecessarily too large, and signal attenuation increases for the opposite reason of weight reduction. In addition, when the ratio of the diameter do of the flat surface 122*a* and the pipe diameter is smaller than 0.63 times, the flat surface 122*a* becomes too small compared to the size of the refrigerant pipe 15, so that the contact area for signal transmission generated from the leak source 400 of the refrigerant pipe 15 becomes smaller. Therefore, the diameter do of the flat surface 122*a* may be 0.63 to 3.15 times the pipe diameter of the refrigerant pipe 15.

According to embodiments disclosed herein, in order to improve amplification performance when designing a jig, the jig 120 may be designed to contact less than 50% of the surface area of the refrigerant pipe 15. Referring to FIG. 8, when viewed in cross section, the surface contact cross-sectional angle cd between the jig 120 and the refrigerant pipe 15 may be designed to be within 180 degrees. A signal transmission is most effective when the surface contact cross-sectional angle cd is about 180 degrees. When it becomes larger than 180 degrees, it is difficult to couple the jig 120 and the refrigerant pipe 15 and the volume becomes too large. If the surface contact cross-sectional angle cd is 160 degrees or less, the contact surface between the jig 120 and the refrigerant pipe 15 becomes small, thereby reducing the signal transmission effect.

Figure 9:
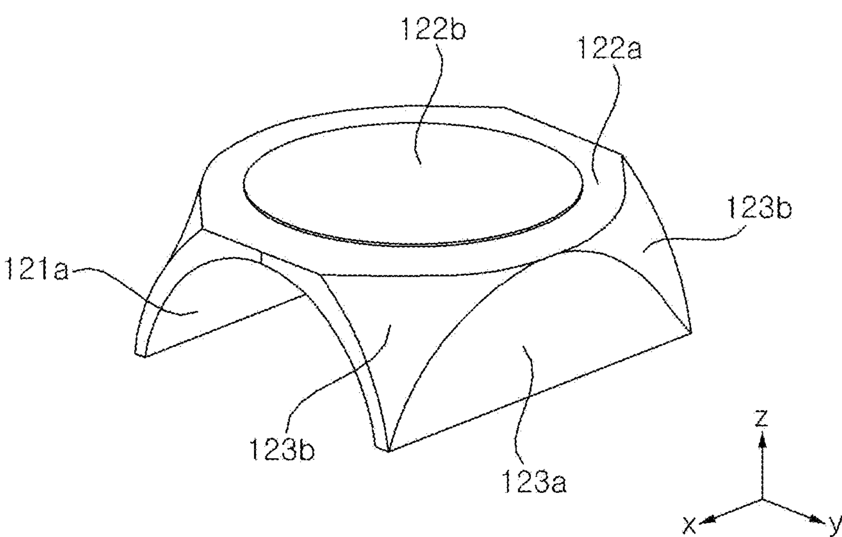
FIG. 9 is a perspective view of a jig according to another embodiment.

FIG. 9 is a perspective view of a jig according to another embodiment, and is an embodiment in which the step portion 122*b* described with reference to FIGS. 7 and 8 and the inclined surface 123*a*, 123*b* described with reference to FIG. 6 are applied together.

Referring to FIG. 9, the jig 120 may include curved surface 121*a* in contact with the outer circumferential surface of the refrigerant pipe 15 and flat surface 122*a* that supports the acoustic emission sensor 110. Accordingly, the signal generated in the refrigerant pipe 15 through surface contact may be transmitted to the acoustic emission sensor 110.

Further, the jig 120 may include step portion 122*b* that focuses the signal generated in the refrigerant pipe 15 on the acoustic emission sensor 110. Furthermore, slimming three-axis machining may be performed on the jig 120 to reduce mass attenuation during signal transmission. Inclined surface 123*a*, 124*b* may be formed through the slimming three-axis machining, and the jig 120 may be made lighter.

Figure 10:
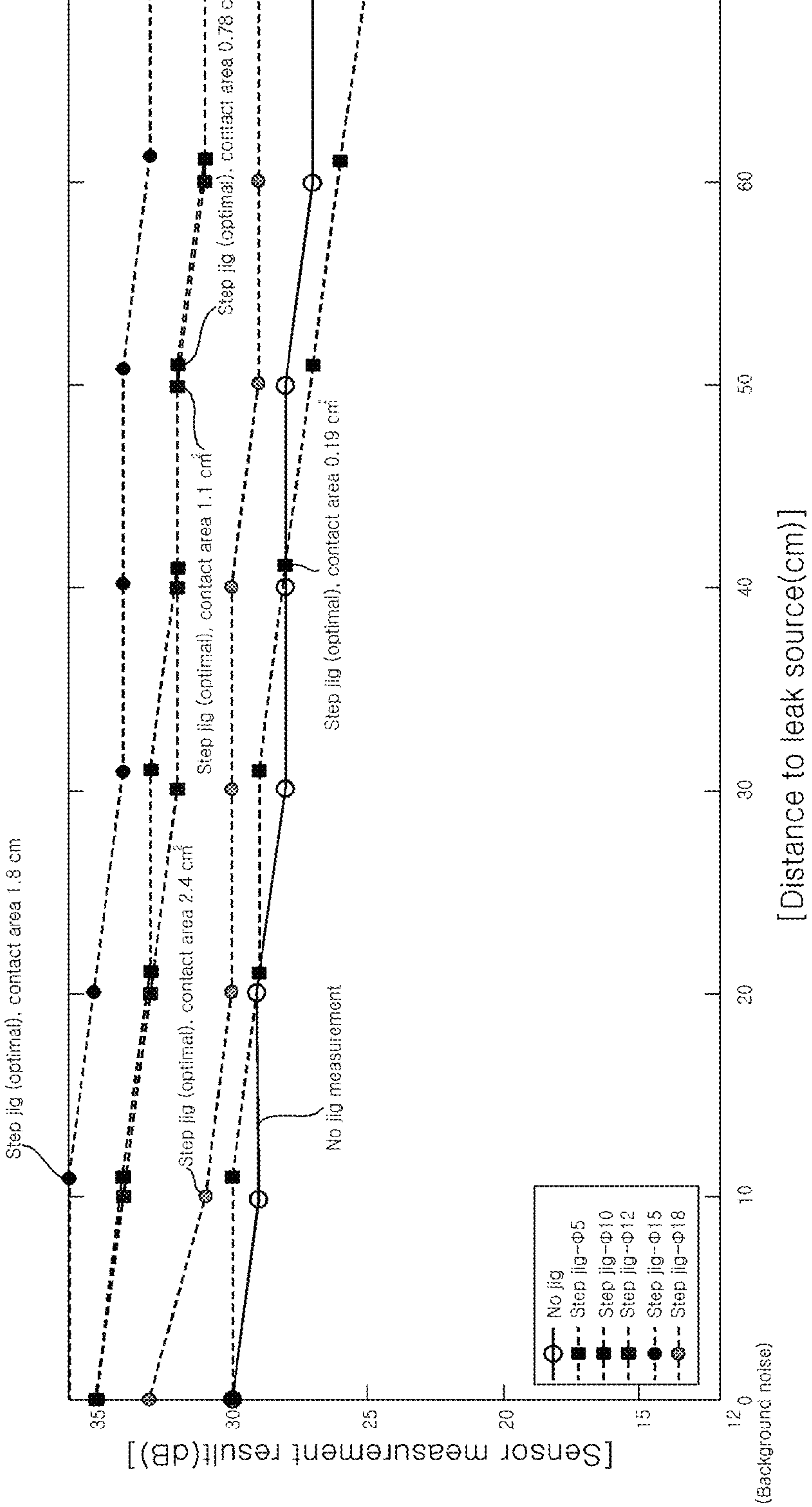
FIG. 10 is a diagram showing a sensor measurement result for each jig diameter.

FIG. 10 is a diagram showing sensor measurement results for each jig diameter. As in the embodiment of FIG. 9, FIG. 10 shows sensor measurement results for each diameter of the jig 120 having the step portion 122*b* and the inclined surface 123*a*, 123*b*. FIG. 10 shows the results of an amplification performance experiment by measuring the sensitivity of the signal according to various contact areas of the lightweight step jig as shown in FIG. 9.

Referring to FIG. 10, the highest amplification value is obtained when the step contact area has ϕ15. However, the contact area may be adjusted not only through a step but also through a perforation or hole, and a step and a perforation or hole may be applied simultaneously. At this time, the experiment was conducted in an environment without external noise by perforating a 40 μm-level fine hole in a ø15.8 pipe and realizing refrigerant leakage at a pressure of 1.2 MPa.

The refrigerant leak detector 100 according to an embodiment uses a jig 120 for losslessly measuring the elastic waves generated by the refrigerant leak, when the refrigerant leak in the air conditioner 1 is diagnosed by the acoustic emission sensor 110. The jig 120 has two contact portions that contact the refrigerant pipe 15 and the acoustic emission sensor 110, respectively. The jig 120 contacts the refrigerant pipe 15 with the curved surface 121*a* and contacts the acoustic emission sensor 110 with the flat surface 122*a*.

The area of each contact portion has a great influence on the signal amplification performance of the jig 120. In the case of the contact area between the jig 120 and the refrigerant pipe 15, it becomes more advantageous as the contact area becomes wider. Accordingly, it is designed to have a maximum area taking into account the convenience of measurement, for example.

The contact surface between the jig 120 and the acoustic emission sensor 110 shows the best signal amplification performance when the surface area is at a certain or predetermined level. This is because the contact surface between the jig 120 and the acoustic emission sensor 110 serves to transmit a certain or predetermined amount of signal received by the jig 120 to the acoustic emission sensor 110, so a total signal amount does not change depending on the contact area. This means that it has a positive effect on a concentration of the signal to appropriately control the contact area, thereby improving performance of the jig 120.

Figure 11A:
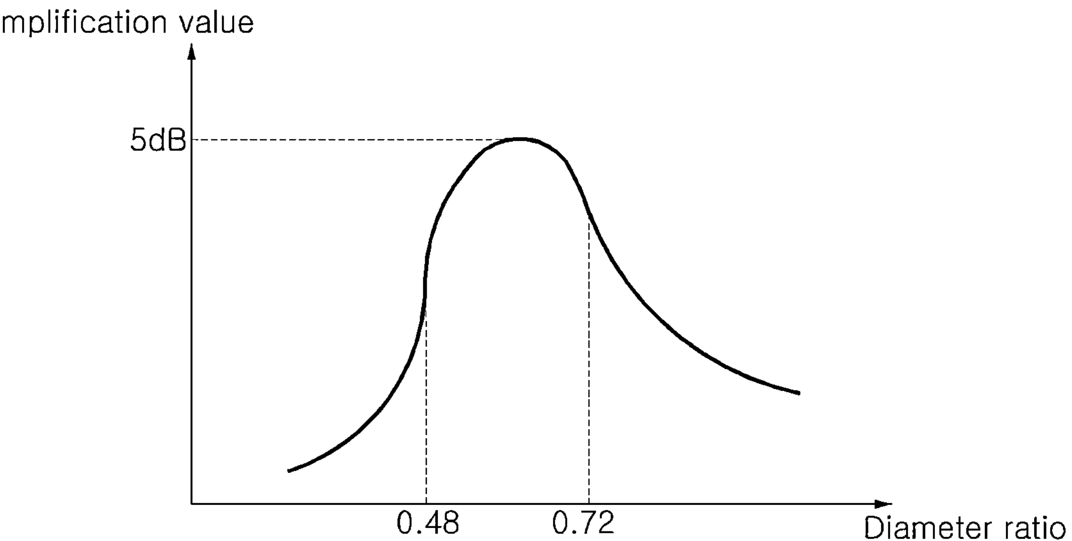
FIGS. 11A and 11B are diagrams showing a result of an experiment on an amount of signal amplification according to a structure of a jig.
Figure 11B:
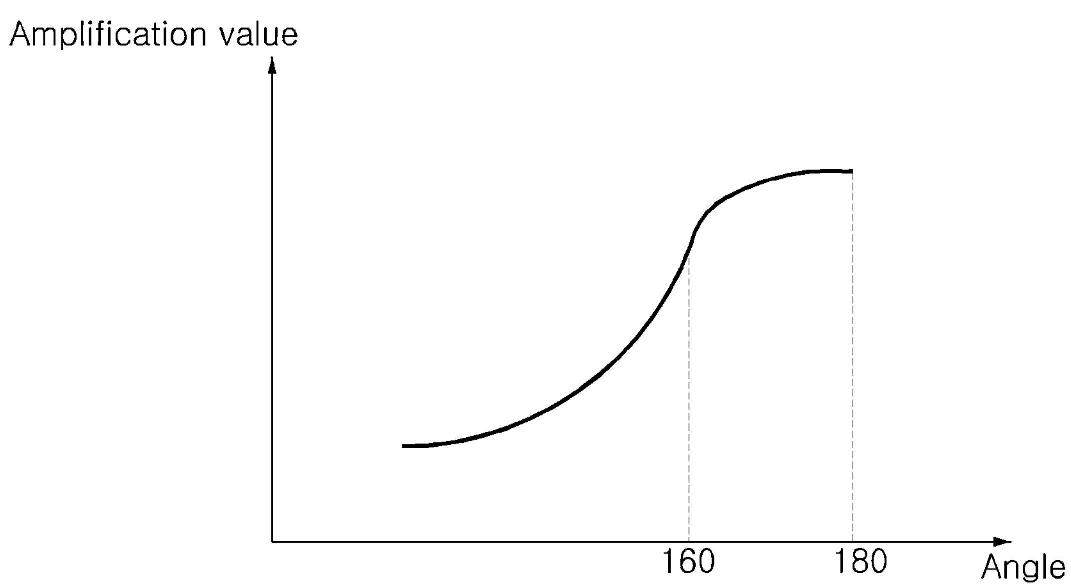

FIGS. 11A and 11B are diagrams showing the results of an experiment on the amount of signal amplification according to the structure of the jig. FIG. 11A shows the results of testing the amount of signal amplification according to the diameter ratio of the step portion 122*b* and the acoustic emission sensor 110 (diameter of the acoustic emission sensor 110/diameter of the step portion 122*b*). Referring to FIG. 11A, the diameter ratio of the step portion 122*b* and the acoustic emission sensor 110 may be 0.48 to 0.72.

If the diameter ratio is greater than 0.72, the step portion 122*b* becomes too large and mass signal attenuation increases. In addition, when the diameter ratio is smaller than 0.48, the step portion 122*b* becomes too small compared to the refrigerant pipe 15, so that the contact area for signal transmission generated from the leak source 400 of the refrigerant pipe 15 becomes small. Referring to FIG. 11A, when the diameter ratio is 0.48 to 0.72, the amplification amount is as high as 5 dB.

FIG. 11B shows the results of testing the amount of signal amplification according to the surface contact cross-sectional angle cd of the jig 120 and the refrigerant pipe 15. Referring to FIG. 11B, the amount of signal amplification is maximum around 180 degrees. If the surface contact cross-sectional angle cd is greater than 180 degrees, it is difficult to couple the jig 120 with the refrigerant pipe 15 and the volume becomes too large. Conversely, if the surface contact cross-sectional angle cd is 160 degrees or less, the contact surface between the jig 120 and the refrigerant pipe 15 becomes small, thereby reducing the signal transmission effect.

Figure 12:
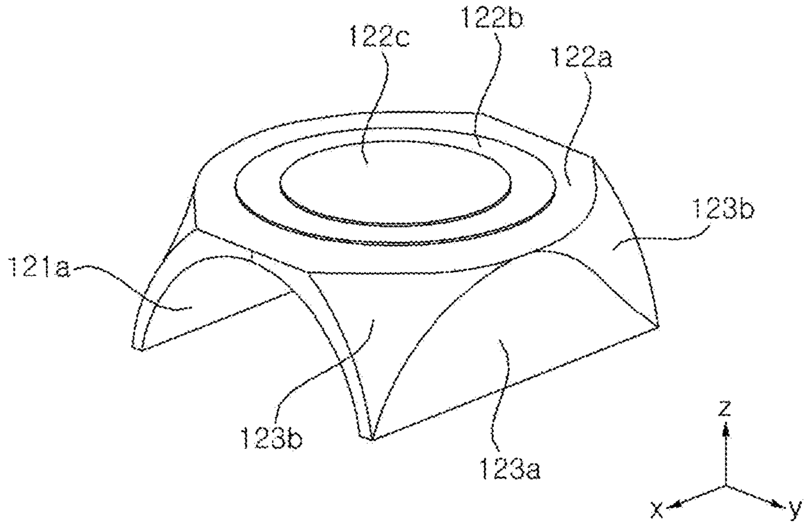
FIG. 12 is a perspective view of a jig according to another embodiment.

FIG. 12 is a perspective view of a jig according to another embodiment. Referring to FIG. 12, step portion 122*b*, 122*c* may include a staircase structure of two or more steps. The step portion 122*b*, 122*c* may include first step portion 122*b* formed on the flat surface 122*a* and second step portion 122*c* formed on the first step portion 122*b*. The second step portion 122*c* may have a smaller area than the first step portion 122*b*. FIG. 12 illustrates a two-step staircase structure of the first and second step portions 122*b* and 122*c*.

In some embodiment, one or more step portions (not shown) may be formed on the second step portion 122*c*. That is, the step portion 122*b*, 122*c* may include a staircase structure of three or more steps.

Figure 13:
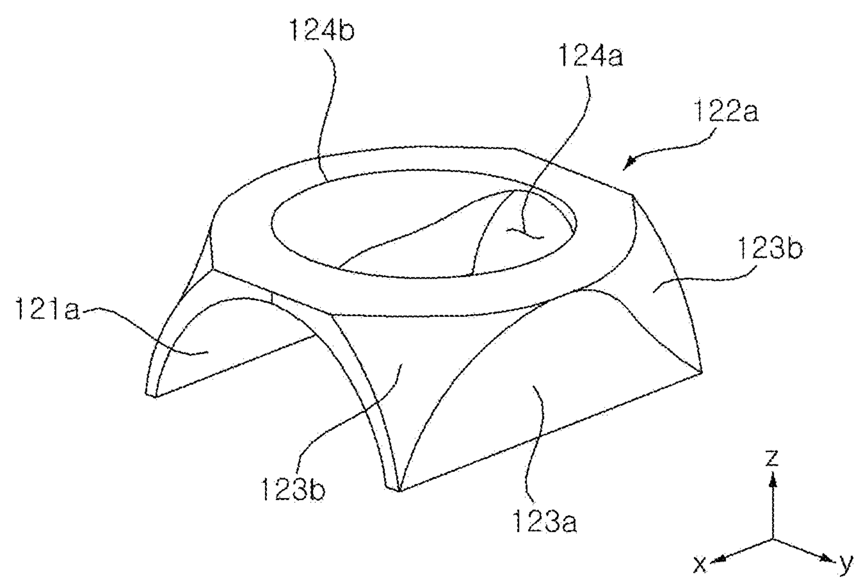
FIG. 13 is a perspective view of a jig according to another embodiment.

FIG. 13 is a perspective view of a jig according to embodiment. Referring to FIG. 13, upper end portion 122 of the jig 120 may further include a hole 124*a* formed in a center of the flat surface 122*a*. As the hole 124*a* is formed, the flat surface 122*a* may include the hole 124*a* and an outer circumferential surface 124*b* that surrounds the hole 124*a*.

As the hole 124*a* is formed, the area of contact with the acoustic emission sensor 110 on the flat surface 122*a* decreases to the outer circumferential surface 124*b*, and a volume of transmitted signal sound per unit area may be increased.

According to embodiments disclosed herein, the step 122*b*/hole 124*a* may be applied separately or simultaneously so as to control the area of the contact portion 520 of jig 120-acoustic emission sensor 110.

Figure 14:
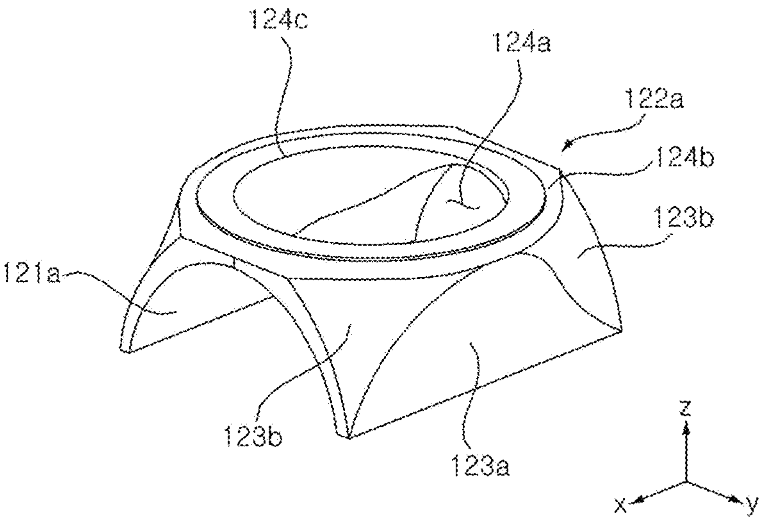
FIG. 14 is a perspective view of a jig according to an embodiment.

FIG. 14 is a perspective view of a jig according to another embodiment. FIG. 14 shows an embodiment in which step 122*b* and hole 124*a* are simultaneously applied to the jig 120. Referring to FIG. 14, the jig 120 may further include step portion 124*c* formed on outer circumferential surface 124*b* that surrounds the hole 124*a*.

Even in this case, a diameter of the step portion 124*c* may be smaller than a diameter of the acoustic emission sensor 110. The diameter of the step portion 124*c* may be 0.48 to 0.72 times the diameter of the acoustic emission sensor 110. In this case as well, the step portion 124*c* may include a staircase-type step structure of two or more steps.

According to embodiments disclosed herein, jig 120 may be manufactured for each pipe diameter to correspond to standardized pipe diameters. FIGS. 15A to 15H are diagrams showing a jig shape for each pipe diameter according to embodiments disclosed herein, and illustrate other jig shapes for each pipe diameter other than the jig for the ϕ15.8 pipe illustrated in FIG. 3, for example.

Figure 15A:
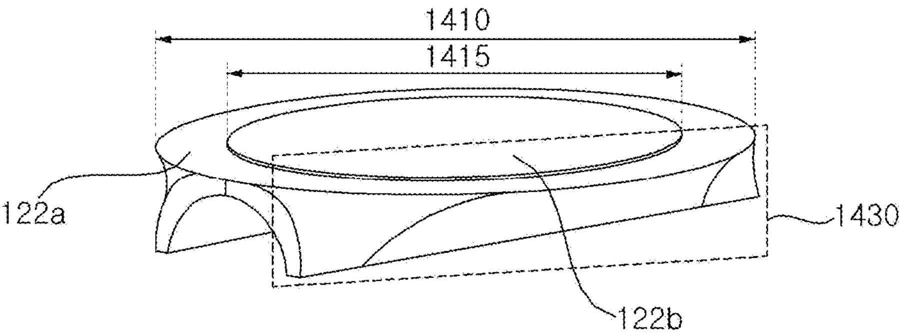
FIGS. 15A to 15H are diagrams showing a jig shape for each pipe diameter according to an embodiment.

FIG. 15A illustrates a jig for a ϕ6.35 pipe. Referring to FIG. 15A, step portion 122*b* may be provided on the flat surface 122*a*. A diameter of upper portion 122 around step portion 122*b* may be determined according to the pipe diameter of the refrigerant pipe 15. That is, diameter 1410 of the flat surface 122*a* may be determined in correspondence with the pipe diameter of the refrigerant pipe 15. Signal loss is small in the range of jig upper diameter/pipe diameter=0.63 to 3.15. Accordingly, the diameter 1510 of the flat surface 122*a* may be 0.63 to 3.15 times the pipe diameter of the refrigerant pipe 15.

Figure 15B:
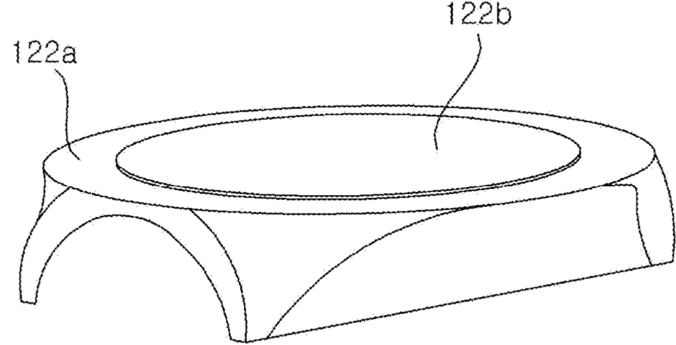
Figure 15C:
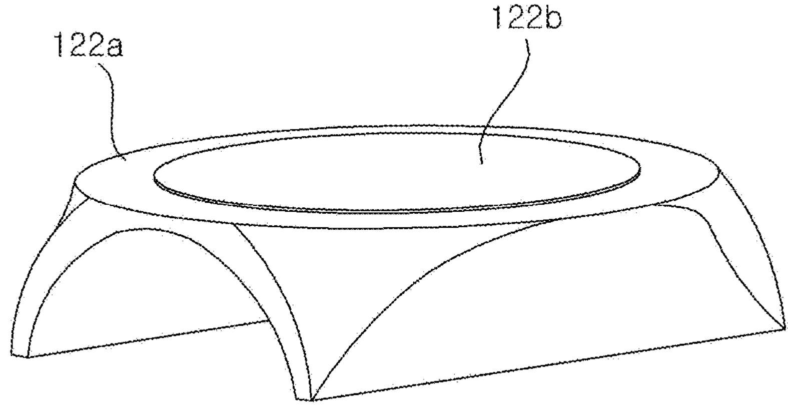
Figure 15D:
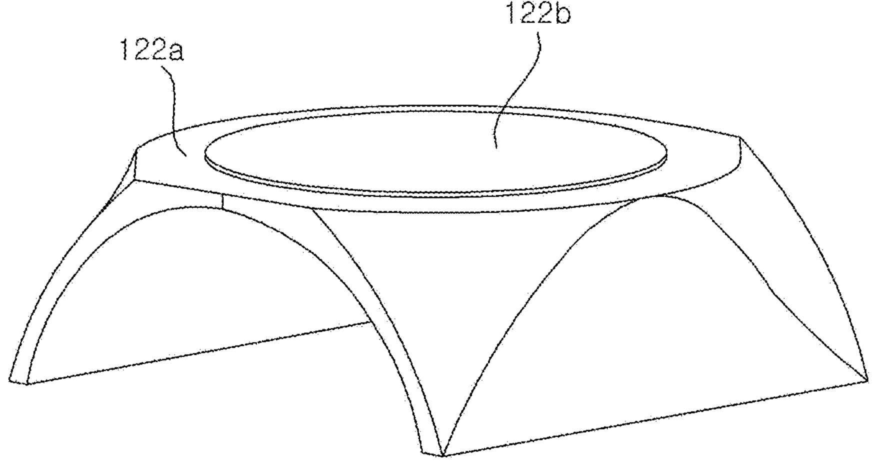
Figure 15E:
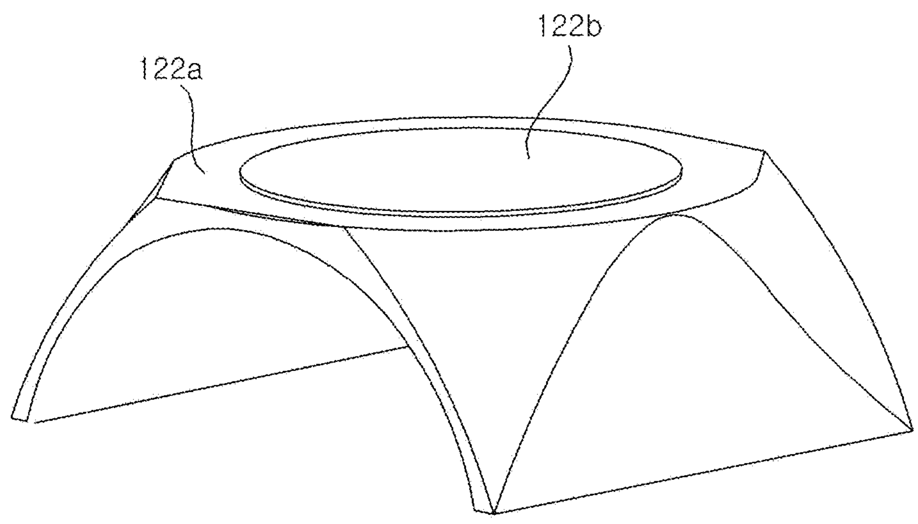
Figure 15F:
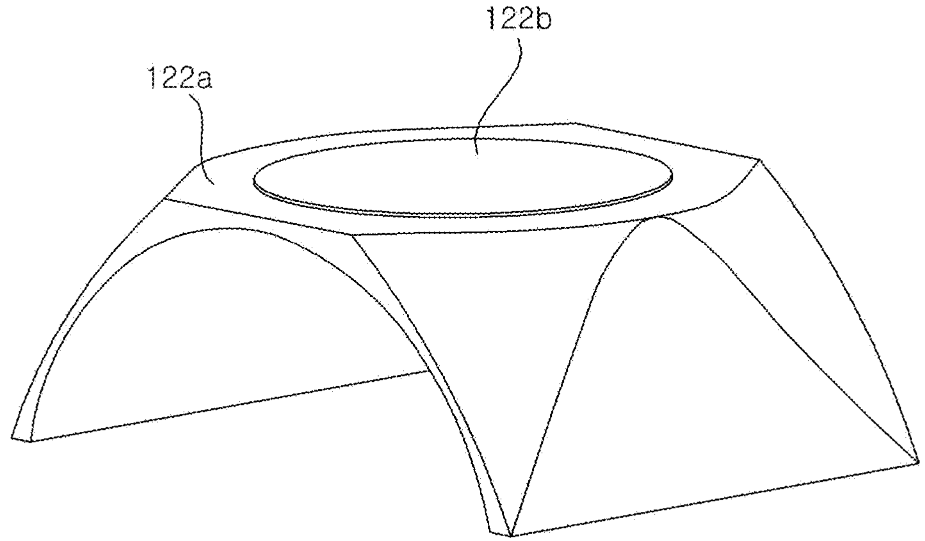
Figure 15G:
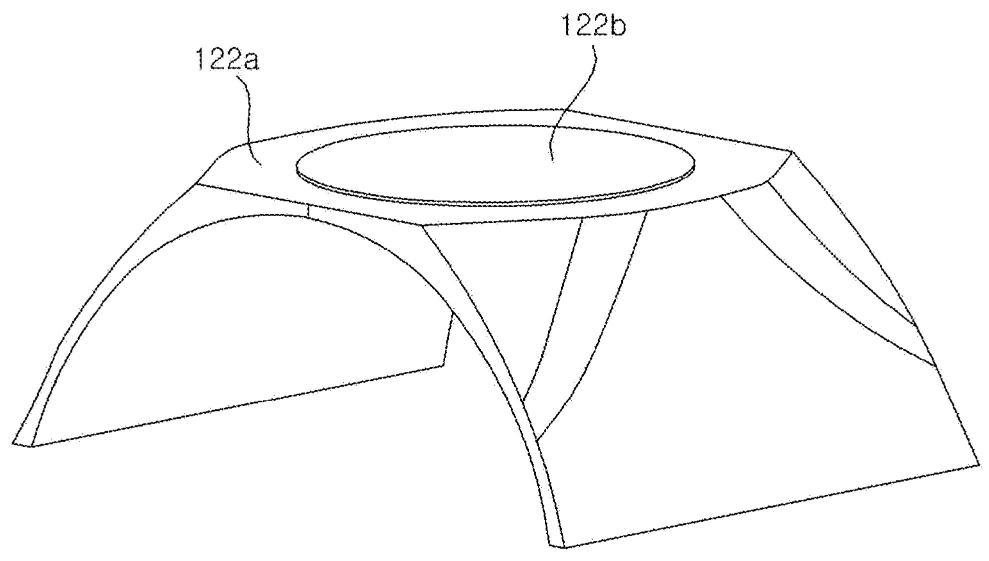
Figure 15H:
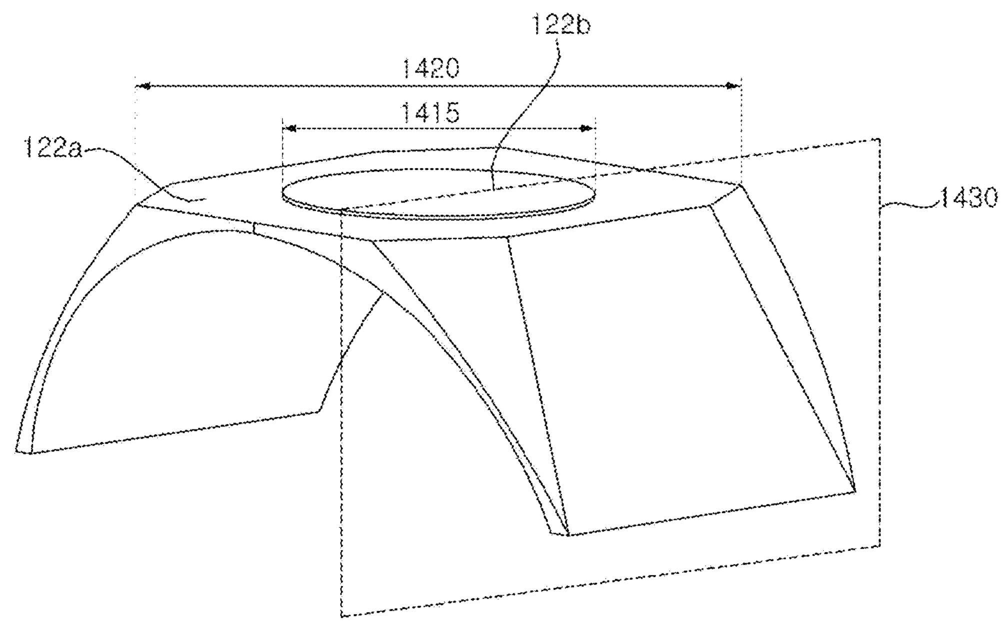

FIG. 15H illustrates a jig for a ϕ31.8 pipe. As the diameter of upper portion 122 around step portion 122*b* is determined according to the pipe diameter of the refrigerant pipe 15, diameter 1420 of flat surface 122*a* of the jig for the ϕ31.8 pipe in FIG. 15H may be manufactured larger compared to the jig for the ϕ6.35 pipe of FIG. 15A.

The diameter 1415 of step portion 122*b* may be determined in correspondence with the diameter of the acoustic emission sensor 110 or the diameter of the receiver of the acoustic emission sensor 110. As the diameter 1415 of the step portion 122*b* is determined based on the acoustic emission sensor 110 regardless of the pipe diameter, the ratio and size difference between the diameter 1415 of the step portion 122*b* and the diameter 1410, 1420 of the flat surface 122*a* vary depending on the pipe diameter.

FIG. 15B illustrates a jig for a ϕ9.52 pipe, FIG. 15C illustrates a jig for a ϕ12.7 pipe, and FIG. 15D illustrates a jig for a ϕ19.05 pipe. FIG. 15E illustrates a jig for a ϕ22.22 pipe, FIG. 15F illustrates a jig for a ϕ25.40 pipe, and FIG. 15G illustrates a jig for a ϕ28.0 pipe.

Referring to FIGS. 15A to 15H, it can be seen that as the pipe diameter of the refrigerant pipe 15 increases, the diameter of the flat surface 122*a* increases. If the acoustic emission sensor 110 used with the jig 120 is the same, the diameter 1415 of the step portion 122*b* does not vary depending on the pipe diameter. Accordingly, referring to FIGS. 15A to 15H, it can be seen that as the pipe diameter of the refrigerant pipe 15 increases, the diameter of the flat surface 122*a* increases, but the diameter 1415 of the step portion 122*b* is the same. Accordingly, as the pipe diameter of the refrigerant pipe 15 increases, the diameter of the flat surface 122*a* increases compared to the diameter 1415 of the step portion 122*b*.

Referring to FIGS. 15A to 15H, in the jig structure for each pipe diameter, slimming is performed on both sides 1430 of the jig 120 through three-axis machining. Slimming is performed to a maximum extent possible without affecting the surfaces (contact surfaces) 121*a*, 122*b*. Therefore, structural change due to slimming may be different for each jig structure for each pipe diameter. Referring to FIGS. 15A to 15H, in the jig structure for each pipe diameter, shapes of both side surfaces 1430, a shape and area of the inclined surface, and a direction and inclination angle of the inclined surface are different.

Referring to FIG. 3, and FIGS. 15A to 15H, jig 120 according to embodiments may be used for all diameters of commercial pipe (Φ6 to Φ35).

Figure 16:
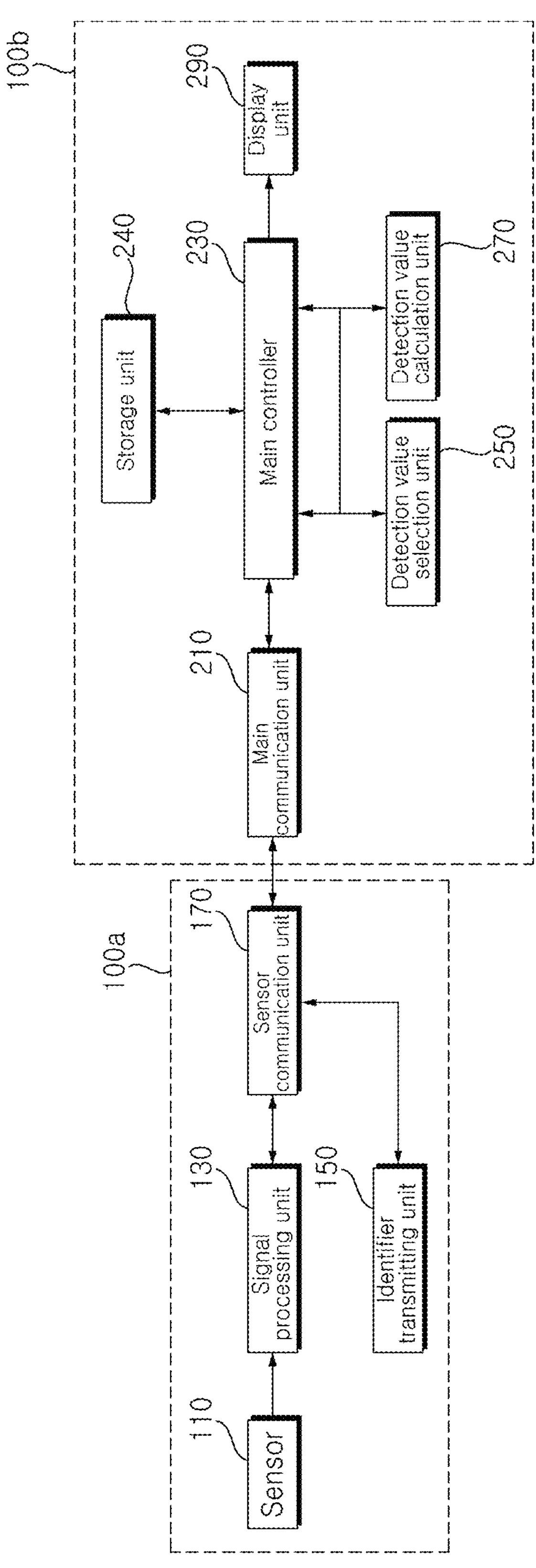
FIG. 16 is a block diagram of a refrigerant leak detector according to an embodiment.

FIG. 16 is a block diagram of a refrigerant leak detector according to an embodiment. Referring to FIG. 16, refrigerant leak detector 100 may include a measuring unit 100*a* including one or more acoustic emission sensors 110 that are installed in refrigerant pipe 15 and detect elastic waves generated from a refrigerant leak location, and a detection unit 100*b* that processes a signal obtained from the acoustic emission sensor 110 and determines whether there is a refrigerant leak and a location of the leak. The measuring unit 100*a* may further include a communication unit 170 that transmits a signal value measured by the acoustic emission sensor 110.

According to an embodiment, air conditioner 1 may be provided with a plurality of refrigerant leak detectors 100, and determine whether there is a refrigerant leak and the location of the refrigerant leak using signal values obtained from the plurality of refrigerant leak detectors 100. The air conditioner 1 may include at least a plurality of measuring units 100*a* to perform measurements at various locations. In this case, the air conditioner 1 may be provided with one or more detection units 100*b*.

The detection unit 100*b* may be provided in an independent detection kit. The detection kit may be configured to be movable.

The detection kit may include a communication unit 210 that receives a signal value measured from the plurality of refrigerant leak detectors 100 (at least the acoustic emission sensor 110), and a controller 230 that determines the leak location based on the ratio of signal values measured by the plurality of refrigerant leak detectors 100 (at least the acoustic emission sensor 110).

According to another embodiment, the outdoor unit 10 or the indoor unit 20 may be provided with the detection unit 100*b*. The outdoor unit 10 or the indoor unit 20 may include communication unit 210 that receives a signal value measured by the plurality of refrigerant leak detectors 100 (at least the acoustic emission sensor 110), and a controller 230 that determines the leak location based on a ratio of the signal value measured by the plurality of refrigerant leak detectors 100 (at least the acoustic emission sensor 110). The measuring unit 100*a* further includes jig 120 that supports the acoustic emission sensor 110 and transmits a signal to the acoustic emission sensor 110.

The acoustic emission sensor 110 may be installed in the refrigerant pipe 15. The acoustic emission sensor 110 may be provided as a plurality. The acoustic emission sensor 110 may be installed in various places in the refrigerant pipe 15.

The acoustic emission sensor 110 detects elastic waves flowing through the refrigerant pipe 15. The acoustic emission sensor 110 detects vibration transmitted through the refrigerant pipe 15. The acoustic emission sensor 110 detects elastic waves generated from the refrigerant leak location. The acoustic emission sensor 110 outputs a detection value.

The detection value transmitted from the acoustic emission sensor 110 may be at least one of information related to an amplitude formed by the elastic wave and a signal arrival time for the elastic wave to reach the acoustic emission sensor 110.

The detection value may be information related to amplitude. The amplitude may be expressed as a voltage. The detection value may be an amplitude recorded at a certain frequency. A certain frequency may be a frequency band that occurs when refrigerant leaks.

The detection value may be information related to a signal arrival time for the elastic wave to reach the acoustic emission sensor 110. The signal arrival time is a time for the elastic wave that is generated when the refrigerant leaks to reach the acoustic emission sensor 110.

The measuring unit 100*a* may further include a signal processing unit 130. The detection value may be filtered in the signal processing unit 130. The detection value may be amplified in the signal processing unit 130. The detection value may be changed into digital information in the signal processing unit 130.

The measuring unit 100*a* may further include a sensor communication unit 170. The sensor communication unit 170 may transmit a signal based on the measurement data of the acoustic emission sensor 110 to the detection unit 100*b*.

The signal processing unit 130 filters the detection value transmitted from the acoustic emission sensor 110. The signal processing unit 130 may change the detection value into a digital signal.

The sensor communication unit 170 may be connected to an identifier transmission unit 150 to enable signal transmission. The sensor communication unit 170 may be connected to the signal processing unit 130 to enable signal transmission.

The measuring unit 100*a* may further include the identifier transmitting unit 150 that transmits an identifier assigned to distinguish a specific acoustic emission sensor 110, when a plurality of acoustic emission sensors 110 are installed. The identifier transmitting unit 150 transmits the identifier. The identifier may be a unique number or signal assigned to each acoustic emission sensor 110. The identifier is selected to distinguish a specific acoustic emission sensor 110 among a plurality of acoustic emission sensors 110. Each identifier is different. The identifier may be previously specified. The identifier transmission unit 150 may be included in the measuring unit 100*a*. The identifier transmission unit 150 may be connected to the sensor communication unit 170. The identifier transmitted by the identifier transmitting unit 150 may be transmitted together with the detection value.

The detection unit 100*b* may further include the main controller 230 that performs overall control operations and the main communication unit 210 that receives identifiers and detection values and transmits them to the main controller 230. The main controller 230 may determine a location of the leak based on a ratio of signal values measured by the plurality of acoustic emission sensors 110.

The main communication unit 210 may be connected to enable communication with the sensor communication unit 170. The main communication unit 210 and the sensor communication unit 170 may exchange wireless signals.

The main communication unit 210 may transmit commands from the main controller 230 to the sensor communication unit 170. The sensor communication unit 170 may transmit the detection value and the identifier to the main communication unit 210.

The detection unit 100*b* may further include a detection value selection unit 250 that sorts the detection values measured by the plurality of acoustic emission sensors 110 in order of size and selects the highest ranked first and second detection values, and a detection value calculation unit 270 that outputs information related to the refrigerant leak location based on the selected first detection value and second detection value. The detection value selection unit 250 selects the detection values output by some of the acoustic emission sensors 110 among the plurality of detection values output by the acoustic emission sensors 110. The detection value selection unit 250 sorts the detection value in order of size. The detection value may be sorted in descending order or in ascending order. It may depend on properties of the detection value.

If a magnitude p of the detection value is inversely proportional to a distance d between the refrigerant leak location and the acoustic emission sensor 110, p is sorted in descending order. If a magnitude t of the detection value is proportional to the distance d between the refrigerant leak location and the acoustic emission sensor 110, t is sorted in ascending order. The detection value selection unit 250 selects a highest ranked first detection value p1, t1 and a second detection value p2, t2.

The detection unit 100*b* may be disposed in the outdoor unit 10. The detection unit 100*b* may form a separate device. The detection unit 100*b* may be formed to be movable.

The detection value calculation unit 270 outputs information related to the location of a refrigerant leak based on the first detection value p1, t1 and the second detection value p2, t2. The detection value calculation unit 270 is included in the detection unit 100*b*.

The detection unit 100*b* may further include a display unit or display 290 that outputs a refrigerant leak and the location of the refrigerant leak according to the control of the main controller 230.

The main controller 230 outputs the refrigerant leak location to the display unit 290. The main controller 230 may distinguish between a first sensor (not shown) that outputs the first detection value and a second sensor (not shown) that outputs the second detection value through the identifier. The information related to the first sensor and the second sensor may include information that can distinguish a corresponding acoustic emission sensor 110 from at least other acoustic emission sensor 110.

The refrigerant leak location may be relative information determined based on the first sensor and the second sensor. For example, the refrigerant leak location may be expressed as 2:3. The 2:3 may be a ratio of the distance from the refrigerant leak location to the first sensor and the distance from the refrigerant leak location to the second sensor.

If the distance between the acoustic emission sensors 110 can be measured, distance information may be directly displayed. The main controller 230 may be connected to a storage unit 240. The storage unit 240 may store a threshold value described hereinafter. The storage unit 240 may include information related to the identifier.

The storage unit 240 may include information related to the identifier and the location of the sensor. The storage unit 240 may include information related to a gap or distance to the sensor.

The main controller 230 may output at least one of the plurality of acoustic emission sensors 110 to the display unit 290. In one embodiment, the detection value calculation unit 270 may output the distance between at least one of the plurality of acoustic emission sensors 110 displayed on the display unit 290 and the refrigerant leak location to the display unit 290. In another embodiment, the detection value calculation unit 270 may output the ratio of signal values measured by the plurality of acoustic emission sensors 110 to the display unit 290.

The main controller 230 may output information indicating that there is no refrigerant leak to the display unit 290 when the detection value measured by one or more acoustic emission sensors 110 is equal to or less than a preset or predetermined threshold value.

The threshold value may be the amplitude of the elastic wave measured by the acoustic emission sensor 110 when there is no refrigerant leak. The threshold value may be a range of voltage output from the acoustic emission sensor 110. The threshold value may be previously set. The main controller 230 may output information indicating a refrigerant leak to the display unit 290 when at least one of the detection values measured by one or more acoustic emission sensors 110 exceeds the threshold value.

Figure 17:
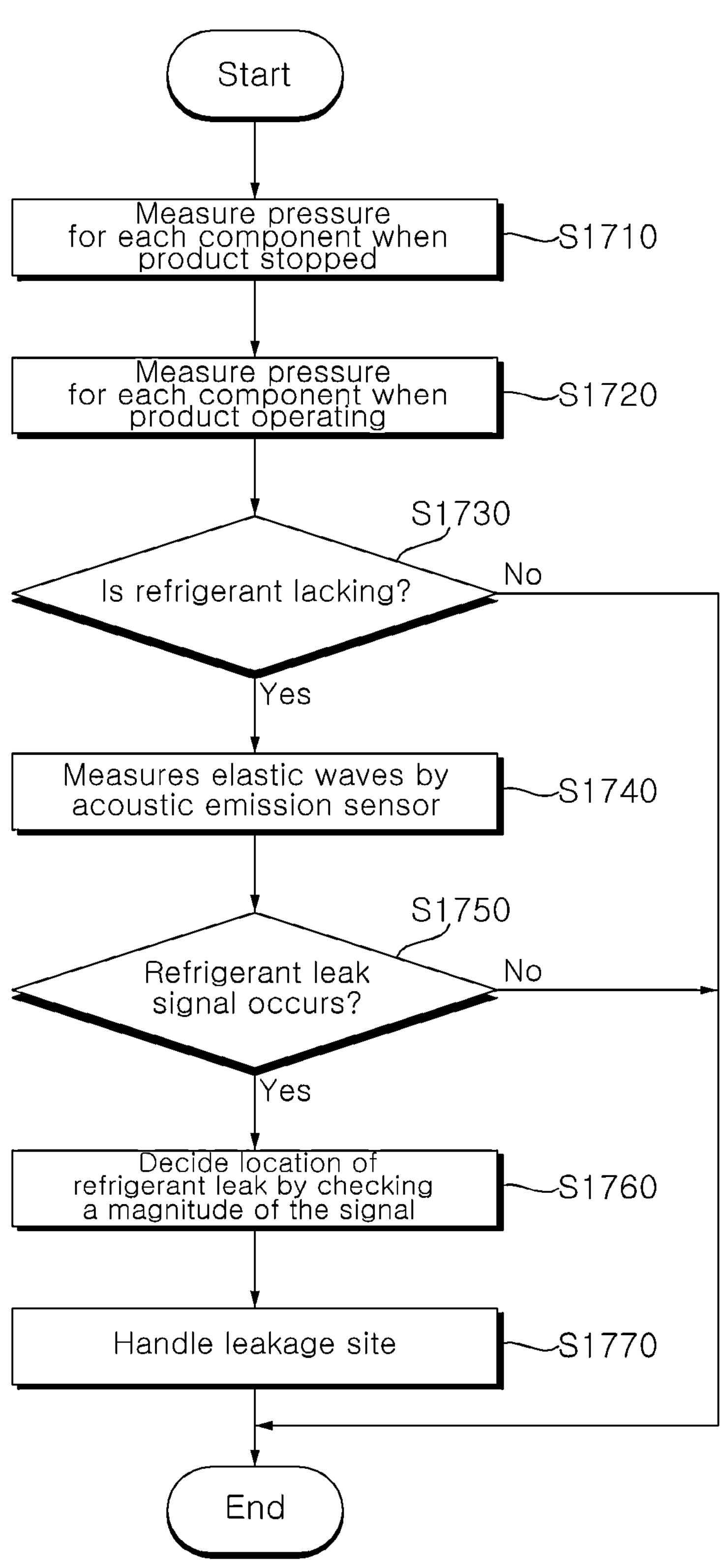
FIG. 17 is a flowchart of a refrigerant leak detection method according to an embodiment.

FIG. 17 is a flowchart of a refrigerant leak detection method according to an embodiment. Referring to FIG. 17, an operator may measure a pressure or temperature for each component when a product is stopped using a monitoring and control program of the air conditioner 1 (S1710), and check the lack of refrigerant in the product by measuring the pressure or temperature for each component when operating the product (S1720). The air conditioner 1 may include sensors that measure temperature, pressure, humidity, carbon dioxide, flow rate, voltage, and current inside and outside the outdoor unit 10, for example. In addition, a plurality of sensors may be disposed in the indoor unit 20. The operator, and the monitoring and control program of the air conditioner 1 may check measurement values of sensors provided in the air conditioner 1.

When the lack of refrigerant in the product is checked (S1730), the operator mounts the jig 120 to each refrigerant pipe 15, and measures elastic waves using the acoustic emission sensor 110 in contact with the jig 120 (S1740). The acoustic emission sensor 110 may detect elastic waves flowing through the refrigerant pipe 15 (S1740).

By using the refrigerant leak detector 100 according to an embodiment, the operator may determine whether there is a refrigerant leak (S1750), check the location of the refrigerant leak (S1760), and handle a leakage problem at the leakage site (S1770).

According to an embodiment, in order to check refrigerant leakage, acoustic emission sensors 110 may be installed at various piping locations to measure elastic waves. In addition, the main controller 230 may determine that there is a leakage location between two acoustic emission sensors 110 having a largest signal value, and may determine the leakage location according to the ratio of the signal values.

It is difficult to find the point of refrigerant leakage at a site where refrigerant leakage is checked through a monitoring program. However, according to the embodiment, the elastic wave caused by the refrigerant leak is transmitted to the acoustic emission sensor 110 without loss, through the jig 120 that makes surface contact with the refrigerant pipe 15 and the acoustic emission sensor 110, so that the location of the leak may be found with minimal time and cost.

According to at least one of the embodiments, it is possible to quickly check whether there is a refrigerant leak in the refrigerant pipe through which the refrigerant flows.

According to at least one of the embodiments, measurement loss of the sensor may be reduced and accuracy of refrigerant leak detection may be improved.

According to at least one of the embodiments, when a refrigerant leak occurs in a product, pipe, or other connection portion of the air conditioner, the location of the refrigerant leak may be quickly checked.

According to at least one of the embodiments, the cost and time required for refrigerant leak detection may be reduced.

According to at least one of the embodiments, accuracy and usability of the acoustic emission sensor may be improved by implementing a jig optimized for the acoustic emission sensor.

Embodiments disclosed herein have been made in view of the above problems, and may quickly check whether there is a refrigerant leak in a refrigerant pipe through which refrigerant flows.

Embodiments disclosed herein may reduce measurement loss of a sensor to improve accuracy of refrigerant leak detection.

Embodiments disclosed herein may quickly identify the location of a refrigerant leak, when a refrigerant leak occurs from a product, a pipe, or other connection portion of an air conditioner.

Embodiments disclosed herein may reduce the cost and time required for refrigerant leak detection.

Embodiments disclosed herein may improve the accuracy and usability of an acoustic emission sensor, by implementing a jig optimized for the acoustic emission sensor.

The refrigerant leak detector and the air conditioner according to an embodiment include a jig to reduce loss of signal measured by a sensor, thereby improving sensing accuracy.

The refrigerant leak detector and the air conditioner according to an embodiment include one or more sensors that detect elastic waves generated at the refrigerant leak site, and a jig to reduce measurement loss of elastic waves, thereby detecting refrigerant leaks accurately and quickly.

The refrigerant leak detector and the air conditioner according to an embodiment measure leaks in a pipe or product by using a movable sensor, thereby reducing the cost and work time for detecting refrigerant leaks.

The refrigerant leak detector and the air conditioner according to an embodiment may include one or more contact sensors, and a jig that is in contact with an outer circumferential surface of the refrigerant pipe and supports the sensor. The jig may include a curved surface in contact with the refrigerant pipe and a flat surface that is located or extends in an opposite direction of the curved surface and supports the sensor.

The refrigerant leak detector and the air conditioner according to an embodiment may include an acoustic emission sensor that detects an elastic wave generated from a refrigerant leak site in a refrigerant pipe; and a jig comprising a lower end portion in contact with an outer circumferential surface of the refrigerant pipe and an upper end portion in contact with the acoustic emission sensor. The lower end portion may include a curved surface in contact with the refrigerant pipe. The upper end portion may include a flat surface that supports the acoustic emission sensor.

The refrigerant leak detector and the air conditioner according to an embodiment may include an acoustic emission sensor that detects an elastic wave generated from a refrigerant leak site in a refrigerant pipe, and a jig that is in contact with an outer circumferential surface of the refrigerant pipe and supports the acoustic emission sensor. The jig may include a lower end portion including a curved surface in contact with the refrigerant pipe and an upper end portion including a flat surface supporting the acoustic emission sensor. Accordingly, elastic waves caused by refrigerant leakage may be transmitted to the acoustic emission sensor without loss.

The upper end portion may further include a step portion formed on the flat surface. A diameter of the step portion may be smaller than a diameter of the acoustic emission sensor. The diameter of the step portion may be 0.48 to 0.72 times the diameter of the acoustic emission sensor. The step portion may include a staircase structure of two or more steps.

The upper end portion further may include a hole formed in a center of the flat surface. The refrigerant leak detector and the air conditioner according to an embodiment may further include a step portion formed on an outer circumferential surface surrounding the hole. A diameter of the step portion formed on the outer circumferential surface may be smaller than a diameter of the acoustic emission sensor. The diameter of the step portion formed on the outer circumferential surface may be 0.48 to 0.72 times the diameter of the acoustic emission sensor. The step portion formed on the outer circumferential surface may include a staircase structure of two or more steps.

The jig may be formed of a material different from that of a case of the acoustic emission sensor. The jig may be made of brass material.

A diameter of the flat surface is determined in correspondence with a pipe diameter of the refrigerant pipe. The diameter of the flat surface may be 0.63 to 3.15 times the pipe diameter of the refrigerant pipe.

A first inclined surface that connects a distal end of the flat surface and a distal end of the curved surface may be formed on both side surfaces of the lower end portion. A second inclined surface, which has a certain or predetermined inclination with respect to the first inclined surface, may be formed on both side surfaces of the lower end portion.

The refrigerant leak detector may further include a communication unit that transmits a signal value measured by the acoustic emission sensors.

The air conditioner according to an embodiment may include a plurality of the refrigerant leak detectors, and may further include a detection kit including a communication unit that receives a signal value measured by the plurality of refrigerant leak detectors and a controller that determines a leak location based on a ratio of signal values measured by the plurality of refrigerant leak detectors.

The air conditioner according to an embodiment may include a plurality of the refrigerant leak detectors, and further include a communication unit that receives a signal value measured by the plurality of refrigerant leak detectors; and a controller that determines a leak location based on a ratio of signal values measured by the plurality of refrigerant leak detectors.

Although embodiments have been described with reference to specific embodiments shown in the drawings, it is apparent to those skilled in the art that the embodiments are not limited to those exemplary embodiments and are embodied in many forms without departing from the scope, which is described in the following claims. These modifications should not be individually understood from the technical spirit or scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" may include any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerant leak detector, comprising:

an acoustic emission sensor that detects an elastic wave generated from a refrigerant leak site in a refrigerant pipe; and a jig comprising a lower end portion configured to contact an outer circumferential surface of the refrigerant pipe and an upper end portion in contact with the acoustic emission sensor, wherein the lower end portion comprises a curved surface configured to contact the refrigerant pipe, wherein the upper end portion comprises a flat surface that supports the acoustic emission sensor, wherein the upper end portion further comprises a step portion formed on the flat surface, and wherein the step portion is configured to focus the elastic wave transmitted from the refrigerant pipe toward the acoustic emission sensor so as to reduce signal loss.

2. The refrigerant leak detector of claim 1, wherein a diameter of the step portion is smaller than a diameter of the acoustic emission sensor.

3. The refrigerant leak detector of claim 2, wherein the diameter of the step portion is 0.48 to 0.72 times the diameter of the acoustic emission sensor.

4. The refrigerant leak detector of claim 1, wherein the step portion comprises a staircase structure of two or more steps.

5. The refrigerant leak detector of claim 1, wherein a hole is formed in a center of the flat surface of the upper end portion.

6. The refrigerant leak detector of claim 5, wherein the step portion is formed on an outer circumferential surface surrounding the hole.

7. The refrigerant leak detector of claim 1, wherein the jig is made of a material different from a material of a case of the acoustic emission sensor.

8. The refrigerant leak detector of claim 1, wherein the jig is made of a brass material.

9. The refrigerant leak detector of claim 1, wherein a diameter of the flat surface is determined in correspondence with a pipe diameter of the refrigerant pipe.

10. The refrigerant leak detector of claim 9, wherein the diameter of the flat surface is 0.63 to 3.15 times the pipe diameter of the refrigerant pipe.

11. The refrigerant leak detector of claim 1, wherein a first inclined surface that connects a distal end of the flat surface and a distal end of the curved surface is formed on both side surfaces of the lower end portion.

12. The refrigerant leak detector of claim 11, further comprising a second inclined surface, which has a predetermined inclination with respect to the first inclined surface, formed on both side surfaces of the lower end portion.

13. An air conditioner comprising one or more of the refrigerant leak detector of claim 1.

14. A refrigerant leak detector, comprising:

one or more sensor; and one or more jig configured to contact an outer circumferential surface of a refrigerant pipe and support the one or more sensors, wherein the one or more jig comprises a curved surface configured to contact a respective refrigerant pipe and a flat surface that is located in a direction opposite to the curved surface and supports the one or more sensor, wherein the one or more jig further comprises a step portion formed on the flat surface, and wherein the step portion is configured to focus and an elastic wave transmitted from the refrigerant pipe toward the one or more sensor so as to reduce signal loss.

15. An air conditioner comprising at least one refrigerant leak detector, the at least one refrigerant leak detector comprising an acoustic emission sensor that detects an elastic wave generated from a refrigerant leak site in a refrigerant pipe, and a jig comprising a lower end portion configured to contact an outer circumferential surface of the refrigerant pipe and an upper end portion in contact with the acoustic emission sensor, wherein the lower end portion comprises a curved surface configured to contact the refrigerant pipe, wherein the upper end portion comprises a flat surface that supports the acoustic emission sensor, wherein the jig further comprises a step portion formed on the flat surface, and wherein the step portion is configured to focus and the elastic wave transmitted from the refrigerant pipe toward the acoustic emission sensor so as to reduce signal loss.

16. The air conditioner of claim 15, wherein the at least one refrigerant leak detector comprises a plurality of refrigerant leak detectors, wherein each refrigerant leak detector comprises a communication unit that transmits a signal value measured by the acoustic emission sensor, and further comprising a detection kit comprising a communication unit that receives a signal value measured by the plurality of refrigerant leak detectors and a controller that determines a leak location based on a ratio of signal values measured by the plurality of refrigerant leak detectors.

17. The air conditioner of claim 15, wherein the at least one refrigerant leak detector comprises a plurality of the refrigerant leak detectors, and wherein each refrigerant leak detector further comprises a communication unit that transmits a signal value measured by the acoustic emission sensor, and further comprising:

a communication unit that receives a signal value measured by the plurality of refrigerant leak detectors; and a controller that determines a leak location based on a ratio of signal values measured by the plurality of refrigerant leak detectors.

* * * * *